United States Patent
Holub

[15] 3,687,248
[45] Aug. 29, 1972

[54] AUTOMATIC GEAR SHIFTING DEVICE

[72] Inventor: Elvin G. Holub, 1718 Paris Place, Enid, Okla. 73701

[22] Filed: Nov. 12, 1970

[21] Appl. No.: 88,955

[52] U.S. Cl..............192/3.54, 192/3.57, 74/483 PB
[51] Int. Cl............................................F16d 67/00
[58] Field of Search..................192/3.54, 3.57, 3.58; 74/483 PB

[56] References Cited

UNITED STATES PATENTS

| | | | |
|---|---|---|---|
| 1,464,962 | 8/1923 | Woodward | 74/483 |
| 2,258,068 | 10/1941 | Randol | 192/3.54 X |
| 2,957,558 | 10/1960 | Croucher | 192/3.57 X |

*Primary Examiner*—Benjamin W. Wyche
*Assistant Examiner*—Randall Heald
*Attorney*—Dunlap, Laney, Hessin & Dougherty

[57] ABSTRACT

Apparatus for shifting automobile gears which utilizes automatic actuators controlled by movement of the related clutch mechanism. The apparatus includes a plurality of gear shift actuators disposed at or near the driver's position, each of which may be actuated to enable an associated gear lever mechanism such that it will be engaged to move the associated gear shift rod upon operation of the clutch mechanism. In the case of a foot clutch, depression and release of the clutch will cause gear shift actuation as a function of the stroke position of the clutch.

9 Claims, 7 Drawing Figures

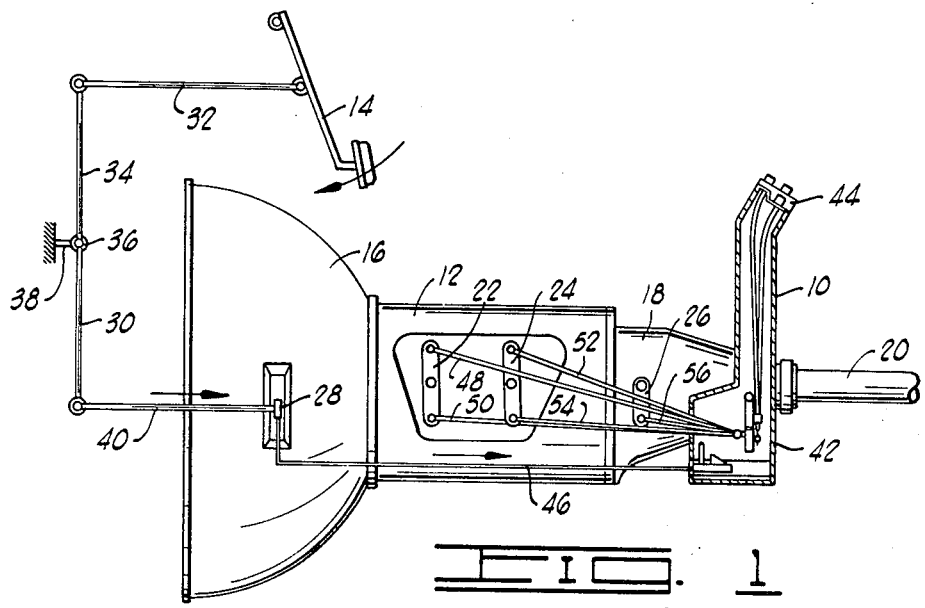
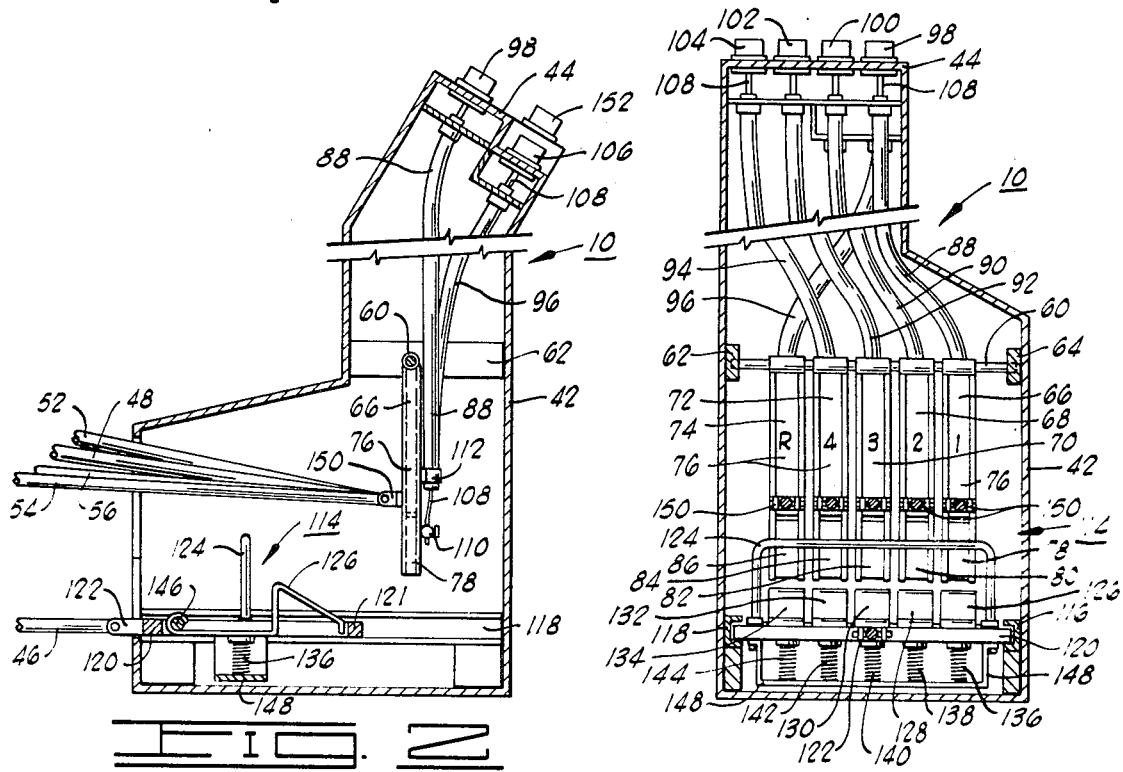

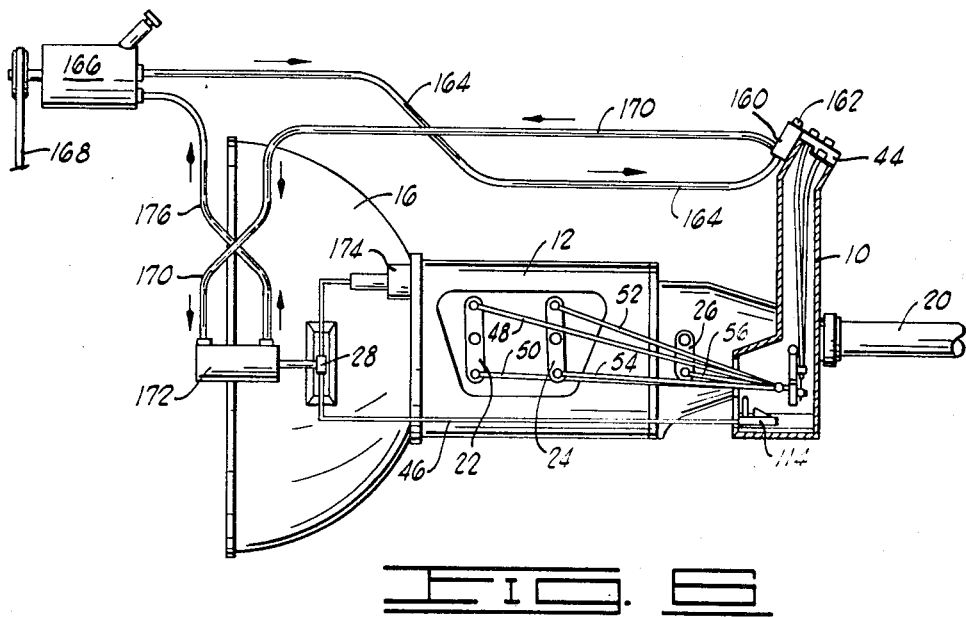
FIG. 6
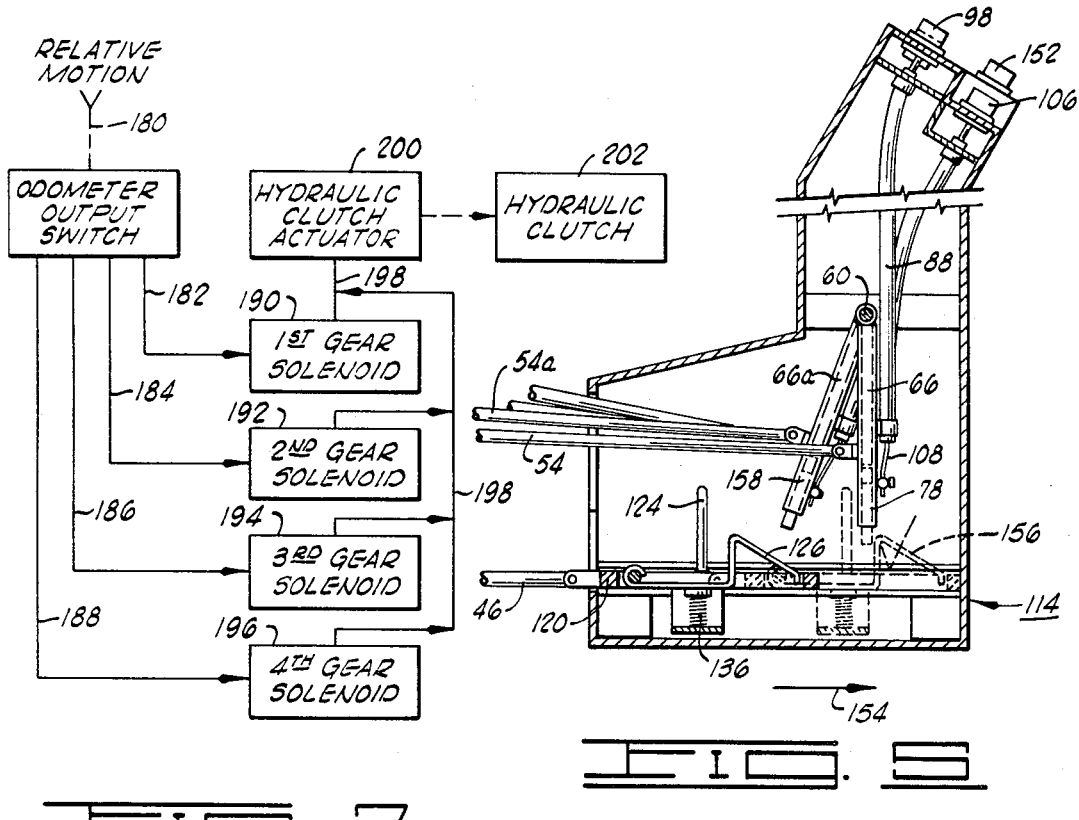
FIG. 7
FIG. 5
INVENTOR
ELVIN G. HOLUB

AUTOMATIC GEAR SHIFTING DEVICE

BACKGROUND OF THE INVENTION

1. Field of the Invention

The invention relates generally to gear shifting mechanisms and, more particularly, but not by way of limitation, it relates to improved gear shifting apparatus which may be enabled from the driver's position for synchronous actuation coincident with related clutch operation.

2. Description of the Prior Art

The prior art includes various types of automatic gear shifting and tracking mechanisms, and such types are primarily well-known through commercial use in the various passenger car applications. Such devices are actually concerned with total automation of the shifting mechanism with sequencing through the sequence of gears in response to automobile speed, engine rpm, etc. These shifting mechanisms are of a quite different nature and structure from the present invention since they are concerned with total automation and elimination of the clutch mechanism as such.

SUMMARY OF THE INVENTION

The present invention contemplates an automatic gear shift actuating mechanism wherein remote selection is made so that gear actuating mechanism is enabled for shift actuation in synchronism with clutch operation. In a more limited aspect, the invention consists of a shift actuation assembly wherein different transmission shift modes are actuated in accordance with selective depression of one of a plurality of shift finger elements conditioned to be contacted by a reciprocating shift plate driven synchronously by operation of the clutch mechanism, and such contacting and moving of a selected shift finger effects gear lever setting on the associated transmission. The shift finger enabling is effected remotely from the drivers position such that pedal actuation of the clutch will effect selection and rotation of the proper gear lever, and it will do so in synchronous relationship to the clutch actuation cycle so that maximum shift efficiency is achieved.

Therefore, it is an object of the present invention to provide a gear shifting mechanism which is effected automatically after initiation of the clutch release-engagement cycle by an operator.

It is also an object of the invention to provide an automatic shifting mechanism which is capable of providing maximum shift efficiency in transferring from one gear ratio to a next selected gear ratio of the transmission gear range.

It is still further an object of the present invention to provide automatic gear shifting mechanism which enables fast, efficient shifting of a vehicle transmission through rapid acceleration.

Finally, it is an object of the present invention to provide a gear shifting mechanism which is adaptable for various usage, either commercial vehicle or racing application, which enables gear shifting with maximum clutch efficiency.

Other objects and advantages of the invention will be evident from the following detailed description when read in conjunction with the accompanying drawings which illustrate the invention.

BRIEF DESCRIPTION OF THE DRAWINGS

FIG. 1 is a side elevation of the gear shifting mechanism of the invention as associated with a standard type transmission and clutch assembly;

FIG. 2 is a vertical section of a shifting assembly constructed in accordance with the invention;

FIG. 3 is an elevation of the shift assembly of FIG. 2 taken transverse to the section of FIG. 2 with parts cut away;

FIG. 4 is a top plan view of the operating panel as shown in FIGS. 2 and 3;

FIG. 5 is a side view in vertical section of a shift assembly with key elements pluralized and depicted at selected stages of actuation;

FIG. 6 is a side elevation of an alternative form of shift assembly as constructed in accordance with the invention; and FIG. 7 is a block diagram of an alternative form of shifting mechanism wherein gear shift sequencing is effected in accordance with pre-determined input.

DETAILED DESCRIPTION OF THE PREFERRED EMBODIMENT

As shown in FIG. 1, a shift actuator assembly 10 may be employed with such as a standard five-speed transmission 12 to effect synchronous gear shifting in response to cyclic depression and release of a clutch pedal 14. The transmission 12 may be a standard form which includes the conventional bell housing 16 and bearing housing 18 leading rearward for connection with a drive shaft 20 which transmits rotational motion to selected wheel driving assemblies (not shown).

The transmission 12 includes the usual transmission shift levers 22, 24 and 26 which control the actual gear selection and placement within the transmission. Thus, the shift lever 22, shown in its neutral position, would be rotated either clockwise or counterclockwise for placement in first or second forward gears, respectively. Similarly, clockwise or counterclockwise rotation of shift lever 24 might determine gear meshing for third or fourth forward gears, respectively, while the single rod shift lever 26 receives only clockwise rotation upon selection to enable reverse gear drive from transmission 12.

The bell housing 16 would contain a standard clutch assembly, not particularly shown, but actuatable in response to movement of a clutch arm 28 which is moved in response to the clutch pedal 14 by means of a mechanical linkage 30. Mechanical linkage 30 consists of a connector rod 32 pivotally connected between clutch pedal 14 and a transfer rod 34 which, in turn, is pivotally connected at a center point 36 to a suitable pivot fastener 38 secured to the frame of the vehicle or surrounding body. The remaining end of transfer rod 34 is then pivotally connected to a connector rod 40 which is fastened to clutch arm 28 to provide actuation control.

The shift actuator assembly 10 may be mounted adjacent transmission 12 within a housing 42, and suitably located to extend a control panel 44 upward and into operational disposition proximate the driver. A clutch rod 46 is connected to clutch arm 28 to be moved in concert with clutch arm 29 responsive to connecting rod 40 to provide synchronous actuation of the shift actuator assembly 10 as will be further described below. A plurality of shift rods 48, 50, 52, 54 and 56 are connected between selected ones of transmission shift levers 22, 24 or 26 to transmit shift actuating motion from the shift actuator assembly 10 in a manner as will be more fully set forth hereinafter.

Referring now to FIGS. 2, 3 and 4, the shift actuator assembly 10 includes a pivot rod 60 as supported between a pair of blocks 62 and 64 which are suitably secured as by welding on opposite sides of housing 42. The pivot rod 60 provides pivotal support for each of a plurality of gear levers 66, 68, 70, 72 and 74. Each of gear levers 66 through 74 includes an upper shift finger 76 which merely acts as a vertical spacer element, and respective lower shift fingers 78, 80, 82, 84 and 86 which are movable vertically to effect selective gear shifting control, as will be further described.

The respective lower shift fingers 78 through 86 are each actuatable downward in response to control as effected through respective cable extensions 88, 90, 92, 94 and 96 which lead up to the operators control panel 44, terminating in the respective selector buttons 98, 100, 102, 104 and 106. As shown in FIG. 2 then, each of the plunger rods 108 of the respective connector cables 88 through 106 is releasably connected in a screw connector 110 which is rigidly secured to each of lower shift fingers 78 through 86. A suitable form of bracket 112 may be secured on each of upper shift fingers 66 through 74 to provide a holding and aligning fixture for each of the connector cables 88 through 96.

An actuator plate assembly 114 serves to effect the actual gear selecting and shifting as it serves to contact a selected one of lower shift fingers 78 through 86 which has been extended downward in response to selection and depression of its respective push-button 98 through 106. The shift plate assembly 114 consists of a pair of U-shaped shift plate tracks 116 and 118 secured in opposite sides of housing 42 to provide a horizontal slide-way for reciprocable movement of a shift plate 120. The shift plate 120 is merely a rectangular frame 121 having its side rails riding within the tracks 118 and 116 and having a forward side secured as by welding to a pivotal fixture 122 which is pivotally affixed to the clutch rod 46. A neutralizer bar 124, an inverted U-shaped bar, is rigidly affixed in upright position across the opposite side rails of rectangular frame 121 comprising the shift plate 120.

The shift plate 120 also carries a plurality of spring-loaded shift movers 126, 128, 130, 132 and 134. Each of the respective shift movers 126 through 134 is tensioned upwardly by a respective compression spring 136, 138, 140, 142 and 144. The shift movers 126 through 134 are each pivotally secured at one end to a pivot rod 146 which is suitably secured transversely across rectangular frame 121 of shift plate 120, and a bracket 148 secured transversely beneath shift plate 120 provides seating for each of the respective compression springs 136 through 144. The pivot rod 146 can be restricted from further counterclockwise movement, i.e. from that shown in FIG. 2, and various means of conventional character may be employed to limit the upward position of shift movers 126 through 134 to that shown (FIGS. 2 and 3).

The front side of each of upper shift fingers 66 through 74 includes a pivot fixture 150 rigidly secured as by welding to provide pivotal affixture to each of the respective shift rods 48 through 56. As shown in FIG. 4, the control selections also include a neutral push button 152. Thus, it would be desirable to include a ratchet-type push button control (not specifically shown) which would assure that only one button at a time can be engaged (depressed) in the actuation position and, a six position ratchet control with the neutral button 152 left unconnected will provide release of all of remaining buttons 98 through 106 during standby or quiescent operation.

OPERATION

In describing the operation, reference is also made to FIG. 5 which illustrates operational positioning of gear levers through a particular gear selection function. Thus, a start position would be similar to that shown in FIG. 2, and first gear selection would bring about depression of push button 98 which would extend plunger rod 108 of cable extension 88 to depress the lower shift finger 78 to a downward position. Thereafter, upon actuation or depression of clutch pedal 14, clutch rod 46 is moved in the direction of arrow 154 to carry shift plate 120 and shift mover 126 to the position 156 shown in dash-lines. The spring loading provision afforded with compression of spring 136 allows the shift mover 126 to depress as it travels past the bottom end of lower shift fingers 78 whereupon it raises up on the other side into a catching position as shown by dash-lines at position 156. Release of the clutch pedal 14 will then allow withdrawal of the clutch rod 46 to move the shift plate 120 back out in the opposite direction. Also, shift mover 126 having caught the lower end of lower shift finger 78, it will move the gear lever 66 into the position 158 such that the gear lever 66 and shift rod 54 now assume the new positions of 66a and 54a. Movement of the shift rod 54a lengthwise serves to rotate the respective transmission gear lever 24.

This shifting sequence functions for each transmission gear as selected by the operator at control panel 44. That is, depression of the selected push-button causes depression of the related lower shift finger 78 through 86, and subsequent cycling of the clutch pedal 14 will cause the respective shift movers 126 through 134 to come in and pick up the respective lower shift finger 78 through 86 which has been depressed such that clutch release will carry it back out to an actuated position.

The neutralizer bar 124 serves the purpose of always disengaging a previously engaged gear lever through the first portion of the clutch operation cycle. That is, as the clutch is pushed in and clutch rod 46 moves in the direction of arrow 154 the neutralizing bar 124 forces any one of gear levers 66 through 74 which is in the actuation position (66a of FIG. 5) back into the vertical or deactivated position. After this neutralization, release of the clutch allows selection of the next gear lever in accordance with depression of the selected lower shift finger.

The operator need only depress a selected gear button and then cycle the clutch, i.e. simply depress and release the clutch without regard for feel, motor sound, or whatever. The clutch movement actually selects the gear actuation, and such actuation is timed so that it takes place at an optimum point in the clutch release and reengagement cycle. The shift actuator assembly 10 is susceptible of various adjustments which will enable optimum gear shifting for each gear of a particular vehicle and power plant. For example, an adjustment of the length of clutch rod 46 will provide the basic adjustment for setting the operational cycle or synchronism of gear shifting with clutch position.

FIG. 6 shonws an alternative form of the invention as it might be utilized with a hydraulic clutch assembly which is also manually actuatable from the console 44. The general structure of the FIG. 6 mechanism is essentially the same as previously described. That is, a shift actuator assembly 10 is connected in usual manner to transmission 12 by means of the plural shift rods 48 through 56, and is actuated by clutch rod 46 from clutch arm 28. The primary difference is in the utilization of a hydraulic clutch device.

A hydraulic control switch 160 is mounted adjacent control panel 44 to include a shifting control button 162. Control 160 is connected via lines 164 to receive hydraulic pressure from a suitable source 166, e.g. the type which may be powered from the vehicle engine by means of fan belt 168. Fluid pressure output from hydraulic unit 166 on line 164 is then controlled by switch 160 for release via line 170 to the input of linear actuator which operates clutch arm 28. A damping device such as a dash pot 174 provides means for slowing down the hydraulic actuation so that a more rhythmic shift cycle can be achieved in the sliding and return movement of shift plate assembly 114. Pressure return from actuator 172 to source 166 is effected by hydraulic pressure line 176.

In operation, the operator can perform the entire driving function of gear selection and shift merely by finger punch. Thus, after selection of the gear at panel 44, and at proper shift time, depression of button 162 applies hydraulic pressure from line 164 to actuate hydraulic actuator 172 and clutch 28. This type of system may find particular use in such as competition drag racing wherein the control panel 44 and all accessible buttons would be mounted in a most optimum position for the driver so that he is able to carry out his shift selections with a minimum of distraction from the roadway ahead.

FIG. 7 illustrates still another alternative form of the invention wherein a hydraulic clutch is employed and controlled in programmed relationship in response to relative motion of the vehicle or such. Thus, relative motion input is applied at 180 to a conventional form of odometer including an output switch which provides shift output of leads 182, 184, 186 and 188 to each of respective first gear solenoid 190, second gear solenoid 192, third gear solenoid 194 and fourth gear solenoid 196. As each of the respective gear solenoids 190 through 196 is actuated to enable the proper gear (e.g. lower shift fingers 78–86), it provides an output via line 198 to a hydraulic clutch actuator 200. The clutch actuator 200 then effects cycling of the clutch, in this case a hydraulic clutch 202 which serves to disengage and engage while at the same time shifting the enabled gear through actuation of the selected one of gear shift levers 22, 24 or 26 of transmission 12. Each of the gear solenoids 190 through 196 is selectively actuated to condition its respective gear lever 66–74 for pickup by the shift plate assembly 114. That is, solenoid actuation will see the respective lower shift fingers 78 through 86 depressed downward into interfering relationship with passage of the shift mover 126.

The foregoing sets forth a novel gear shifting device which is especially attractive for use in various forms of competition driving. The device enables a pre-selection of a gear prior to the actual shift where-upon cyclic manipulation of the clutch pedal, i.e. depression and release, will automatically bring about the gear shift at the optimum point in the clutch cycle. This obviously enables advantageous shifting for various racing maneuvers since individual cars and their associated gear machinery can be adjusted to a very fine degree to gain advantage of optimum shift versus clutch position and, after automatic selection, the actual shifting still remains within the operators judgement and determination as to proper engine speed. It is contemplated too that the present invention can be of great advantage in many other forms of driving, both commercial and standard vehicular driving.

Changes may be made in the combination and arrangement of elements as heretofore set forth in the specification and shown in the drawings; it being understood that changes may be made in the embodiment disclosed without departing from the spirit and scope of the invention as defined in the following claims.

What is claimed is:

1. A device for shifting gears of a multispeed transmission having a respective shift lever and shift rod for each speed, said transmission drive input being coupled by an operator-actuated clutch mechanism, the device comprising:

plural shifting means each attached to a respective shift rod and each being actuatable to move said respective shift rod to rotate a respective shift lever;

enabling means operatable by the operator to enable a selected one of said shifting means for actuation;

slide plate means which is movable to contact and enable one of said shifting means to cause actuation thereby to move said respective shift drive; and connecting rod means providing mechanical linkage between said clutch mechanism and said shift plate means such that shift plate means is moved reciprocally in a cycle of movement synchronous with release and re-engagement of the clutch mechanism.

2. A device as set forth in claim 1 wherein each of said plural shifting means comprises:

lever means having a first end pivotally affixed proximate to said transmission and being pivotally affixed in a central portion to a respective transmission shift rod, the second end of said lever means being extendable to a position which enables said shifting means for actuation.

3. A device as set forth in claim 2 wherein said enabling means comprises:

plural means operated selectively by the operator to effect extension of the extendable second end of a selected one of said lever means.

4. A device as set forth in claim 1 which is further characterized to include:

housing means secured proximate said transmission, said housing means including a portion extending accessibly to the operator and supporting a plurality of push-buttons, each of such push-buttons being actuatable to selectively control said enabling means, said housing means also including a transversely aligned pivot rod support each of said plural shifting means in sequentially juxtaposed relationship.

5. A device as set forth in claim 4 wherein each of said plural shifting means comprises:

lever means having a first end pivotally affixed to said pivot rod and having a second end which is extendable to an extended position which enables said shifting for actuation.

6. A device as set forth in claim 5 wherein said connecting rod means comprises:

a plurality of shift mover elements disposed on said slide plate means, each shift mover element being aligned with a respective lower end of a lever means, said shift mover elements including a raised formation which comes into interfering contact with the second ends of said lever means in the extended position;

plural compression spring means disposed below each of said shaft mover elements to continually urge said elements upward to a fixed position.

7. A device as set forth in claim 6 which is further characterized to include:

neutralizer bar means rigidly secured across said slide plate means parallel to said line of lever means so that upon initial actuation of a clutch mechanism and initial movement of said shift plate means, said neutralizer bar means urges all lever means to a neutral position whether or not a selected one of said lever means second ends has been placed in its extended position.

8. A device as set forth in claim 5 which is further characterized in that:

said clutch mechanism is a hydraulic actuator clutch mechanism; and push-button means manually operated by the operator provides actuation of said hydraulic clutch mechanism.

9. A device as set forth in claim 8 which is further characterized to include:

odometer means providing a series of actuation outputs in response to a selected motional parameter of said multi-speed transmission;

plural control means each responsive to a selected one of said odometer output control indications to actuate a selected one of said lever means and thereafter effect actuation of said hydraulic clutch mechanism.

* * * * *